United States Patent [19]

Stenger et al.

[11] Patent Number: 5,399,427
[45] Date of Patent: Mar. 21, 1995

[54] SINGLE-LAYERED, TRANSPARENT, BIAXIALLY ORIENTED, THERMOSET TUBULAR FOOD CASING

[75] Inventors: Karl Stenger, Ruedesheim; Dieter Beissel, Wiesbaden, both of Germany

[73] Assignee: Hoechst Aktiengesellschaft, Frankfurt am Main, Germany

[21] Appl. No.: 988,315

[22] Filed: Dec. 9, 1992

[30] Foreign Application Priority Data

Dec. 14, 1991 [DE] Germany .............. 41 41 292.3

[51] Int. Cl.⁶ ........................................ A22C 13/00
[52] U.S. Cl. ...................................... 428/348; 206/802; 138/118.1
[58] Field of Search ............... 428/34.8; 138/118.1; 206/802

[56] References Cited

U.S. PATENT DOCUMENTS

| | | | |
|---|---|---|---|
| 4,486,507 | 12/1984 | Schumacher | 428/476.1 |
| 4,659,599 | 4/1987 | Strutzel | 428/36 |
| 4,764,406 | 8/1988 | Hisazumi et al. | 428/35 |
| 4,851,245 | 7/1989 | Hisazumi et al. | 426/105 |
| 4,944,970 | 7/1990 | Stenger et al. | 428/34.8 |

FOREIGN PATENT DOCUMENTS

| | | |
|---|---|---|
| 0358038 | 8/1989 | European Pat. Off. |
| 0450435 | 10/1991 | European Pat. Off. |
| 8708867 | 10/1987 | Germany |
| 3943024 | 7/1991 | Germany |
| 4001612 | 7/1991 | Germany |

OTHER PUBLICATIONS

Saechtling, "Plastics Pocketbook", pp. 285–287.
Vieweg et al, "Plastic Handbook Polyamide", vol. IV, pp. 623–633, (1966).

*Primary Examiner*—Charles R. Nold
*Attorney, Agent, or Firm*—Foley & Lardner

[57] ABSTRACT

A single-layered, transparent, biaxially oriented, thermoset tubular food casing, in particular a synthetic sausage casing, based on polyamide, containing a mixture of a) a linear, aliphatic polyamide, b) a partially aromatic copolyamide, c) an acid-modified polyolefin and d) a pigment of a particle size from 0.01 to 15 μm results in a casing having outstanding properties such as excellent water vapor resistance and excellent UV and visible light impermeability. A process for the production of the food casing and the use thereof are also described.

20 Claims, 1 Drawing Sheet

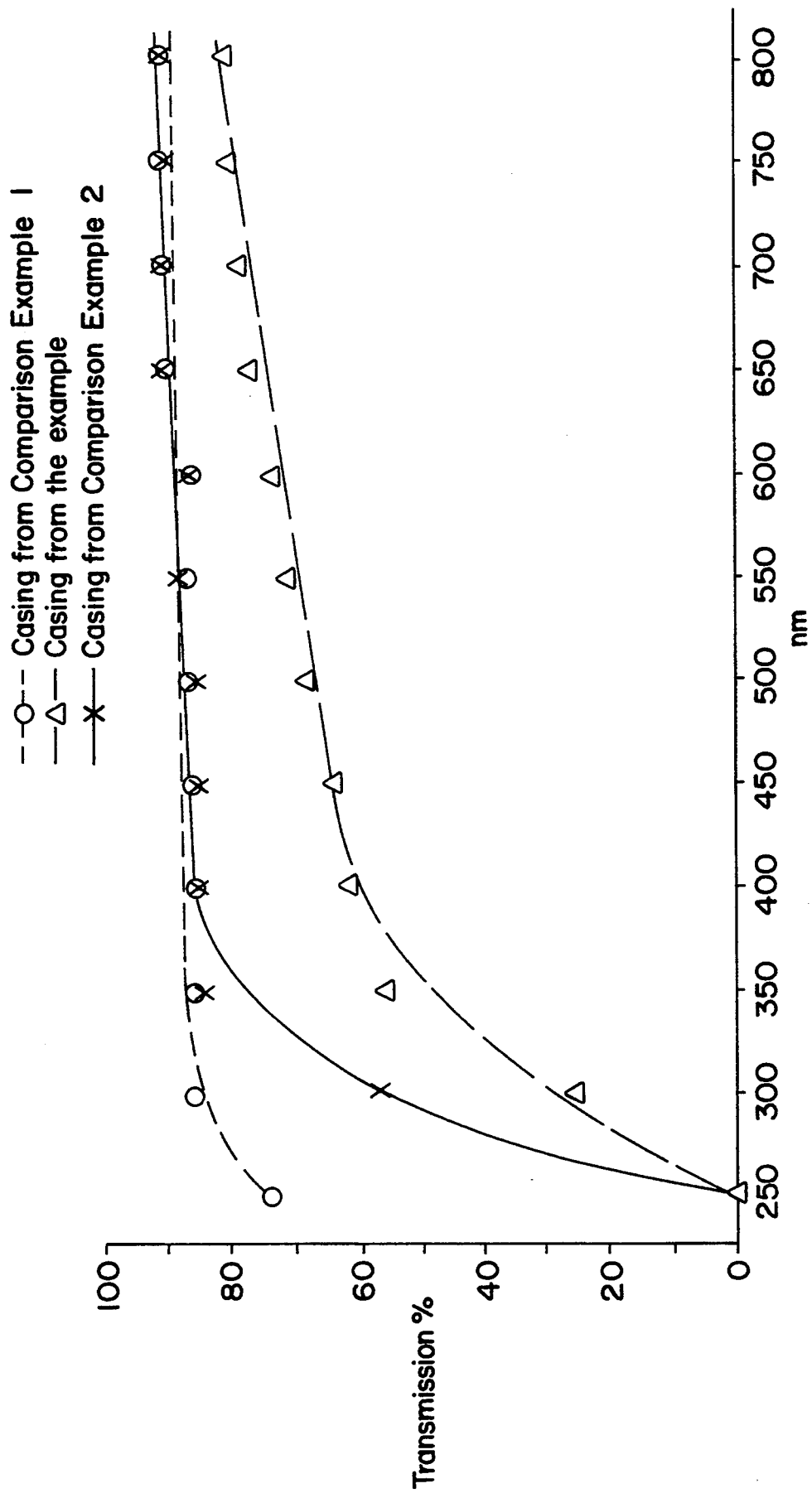

SINGLE-LAYERED, TRANSPARENT, BIAXIALLY ORIENTED, THERMOSET TUBULAR FOOD CASING

BACKGROUND OF THE INVENTION

1. Field of the Invention

The invention relates to a single-layered, transparent, biaxially oriented, thermoset tubular food casing, in particular a synthetic sausage casing, based on polyamide.

2. Description of Related Art

Food casings based on polyamide are described in the literature. See, for example, Saechtling, Kunststoff-Taschenbuch [Plastics Pocketbook] or Kunststoff-Handbuch [Plastics Handbook], Volume IV, "Polyamides", or Karmas, Sausage Casing Technology). In many cases, polymer mixtures containing polyamides are used in order to compensate for certain disadvantageous properties of the pure polyamide (see EP-A-0 176 980). For example, although pure polyamide casings can be clear, that is they have a high transparency, their water vapor barrier is substantially lower than in comparable casings made of polyamide blends.

For certain types of sausages, in particular scalding and boiled sausages, it is desirable to maintain the high transparency, aroma tightness and heat and cold resistance of the polyamide casing, while at the same time improving the water vapor barrier and the oxygen tightness. For this purpose, various additives or changes in the composition of the polymer mixtures used or an orientation of the polyamide casings are described in the literature, but as a result of these modifications the transparency of the casing or other important properties are impaired.

Thus it is known, for example, that casings made of polyolefins, in particular polyethylene (PE) and polypropylene (PP), have an outstanding water vapor tightness. However, processing the polyolefin in a blend with polyamides (PA) simultaneously sharply decreases the oxygen barrier of the resulting casing.

Moreover, casings made of such a PA/PE blend have a bluish, mother of pearl-like shine, which gives the impression of a moldy, decayed product. In addition, with an increasing polyolefin fraction in the blend, the sausage meat adhesion becomes progressively poorer and an undesired jelly deposition occurs. Moreover, the printability becomes increasingly poorer with increasing polyolefin fraction.

Further attempts are known from the art to improve the properties of the casings based on polyamide. In particular, in DE-A 39 43 024, a single-layered, tubular, stretch-oriented packaging casing is described which essentially comprises nylon 6 and a part-aromatic copolyamide composed of hexamethylenediamine, terephthalic acid and isophthalic acid units. The sausage casing is clear and has a particularly high resilience, which is said to ensure fold-free fitting of the casing against the sausage. However, in practical use this casing still showed much too high a water vapor permeation, which, particularly with small caliber casings ($\phi < 45$ mm), leads to undesired weight losses and drying of the sausage. With storage and transport times of the sausages of more than 2 weeks, premature drying of the sausage product takes place in association with a color change, as a result of which the sausage gives an aged, decayed impression.

EP-A 0 065 278 describes a transparent shrinkable film made of at least one layer of a polymer mixture of linear aliphatic polyamide and/or an elastomeric component and 15 to 90% by weight of a part-aromatic polyamide. The elastomeric component described is polybutadiene and mixtures of polyamides with polybutadiene. The film has good shrink properties, good transparency and a high surface polish, the beneficial physical properties of the polyamide being maintained. However, the barrier properties are still in need of improvement.

EP-A 0 358 038 describes a blend of an amorphous nylon copolymer and a nylon copolyamide. The amorphous polyamide component described is a copolyamide composed of hexamethylene units, isophthalamide units and terephthalamide units; the copolyamide component includes copolymers of nylon 6 and a further polyamide, preferably nylon 6/12 or nylon 6/66. Optionally, the blend can contain as an additional component a polyamide homopolymer such as nylon 6, nylon 11, nylon 12. This blend is to be used according to the description for the production of packaging casings and packaging films for foods. In a further embodiment, further layers of suitable polyolefin materials or suitable polyesters can be applied. Such polymer laminates frequently show an unsteady stretching behavior in the production of biaxially oriented tubes. Furthermore, as a result of the multilayer casing design claimed, the production of such a casing is expensive and complicated.

EP-A 0 450 435 describes shrinkable tubular films based on a polyamide/polyolefin polymer mixture which contains aliphatic polyamides and an acid-modified olefin copolymer, in particular ethylene/acrylic acid (EAA) and ethylene/methacrylic acid. This tubular film is said to have an improved barrier effect against water vapor and oxygen and an improved peeling behavior. As a result of the EAA addition alone, the specific $O_2$ barrier is reduced in comparison with the pure nylon 6 casing. With an increase in the acrylic acid fraction in the copolymer, the $O_2$ permeation rate can be reduced, but this leads simultaneously to a reduction in the water vapor tightness.

SUMMARY OF THE INVENTION

It is therefore an object of the present invention to provide a casing that avoids the disadvantages of the casings based on polyamide described in the art. In particular, it is an object of the invention to provide a low-shrink food casing that has an improved barrier to UV light, without impairing the excellent transparency that is possible with pure polyamide casings. In this case, the barrier properties against water vapor and oxygen are to be simultaneously improved. These combined properties contribute to a longer storage life of the sausage product and maintain the quality of the goods even with storage and transport times of a number of weeks.

Moreover, in accomplishing these objectives, other important advantages of the casings based on polyamide are not to be impaired. For example, the casing material must not block, something which is exceptionally disruptive during fabrication, shirring and in the filling process. In addition, a good printability of the casing material is required and for special applications the casing must be easy to dye. As a result of a low shrinkage, even at elevated temperature, a good constancy of caliber and a fold-free product fitting of the casing to the sausage product are to be ensured. In addition, the material strength of the casing is to be increased by orientation in such a manner that, although the film is flexible, a firm filling during production of the sausage is possible without a deformation of the tube. Further, in combination with an affinity obtained without additional working steps, such as plasma treatment, of the inner casing surface for sausage meat, fold-free fitting of the casing to the sausage product is needed such that the separation of juice from the sausage meat during the scalding and cooling process is avoided.

Furthermore, all changes with regard to an improvement in the above-described properties must not impair the ease of processing of the material, in particular high constancy in stretching must continue to be ensured. Hitherto, no sausage casings based on polyamide have been disclosed that comprehensively satisfy the high requirements in sausage manufacture and have all of the properties to the desired extent with regard to the complex profile of requirements.

It is further an object of the present invention to provide a process for producing such a food casing and to provide a food-stuff encased by the casing.

In accomplishing the foregoing objectives, there has been provided, in accordance with one aspect of the present invention, a single-layered, transparent, biaxially oriented, thermoset, tubular food casing comprising a mixture of:

a) a linear, aliphatic polyamide,
b) a partially aromatic copolyamide,
c) an acid-modified polyolefin, and
d) a pigment of a particle size from about 0.01 to about 15 μm.

In accordance with another object of the present invention there has been provided a process for the production of such a food casing comprising the steps of extruding the melt of the mixture to give a tubular casing, stretching the casing in the longitudinal and transverse directions, and thermosetting the stretched casing.

Further objects, features, and advantages of the present invention will become apparent from the detailed description of preferred embodiments that follows.

BRIEF DESCRIPTION OF THE DRAWINGS

FIG. 1 shows the transmission measurements of a casing according to the invention and comparative casings.

DETAILED DESCRIPTION OF THE PREFERRED EMBODIMENTS

The linear aliphatic polyamides in the food casings of the present invention include linear homopolyamides and copolyamides built up from aliphatic constituents, such as, for example, nylon 6, nylon 66, nylon 610, nylon 11 and nylon 12. The copolyamides generally are formed from aliphatic polyamides having 5 to 20 carbon atoms. The term linear aliphatic polyamides also includes those copolyamides that contain small amounts of cycloaliphatic compounds and/or aromatic compounds, these amounts being less than the amount of aromatics present in the partially-aromatic copolyamides described in more detail below which the casing also comprises. The linear aliphatic polyamides generally contain no more than 10 mol %, preferably no more than 5 mol % of aromatic components.

The linear polyamides particularly preferred are those composed exclusively of aliphatic constituents. Nylon 6, nylon 11 and nylon 12 have proven to be very particularly advantageous.

The proportion of linear polyamide in the total mixture can vary within wide limits and is generally in a range from about 44.5 to about 89.5% by weight, preferably in a range from about 60 to about 80% by weight, based on the total weight of the mixture.

Partially-aromatic copolyamides include those polyamides that are built up either from aromatic diamine components and aliphatic dicarboxylic acid components or conversely from aliphatic diamine components and aromatic dicarboxylic acid components. The proportion of the particular aromatic component is generally between about 30 and about 80 mol %, preferably between about 40 and about 60 mol %, and the proportion of the corresponding aliphatic component is generally between about 80 and about 30 mol %, preferably between about 60 and 40 mol %, based on the copolyamide.

In a preferred embodiment, polycondensates of linear aliphatic alkylenediamines having 5 to 15 carbon atoms and aromatic dicarboxylic acids are used, the linear aliphatic diamines including those such as hexamethylenediamine, 1,7-diaminoheptane, 1,8-diaminooctane, 1,10-diaminodecane, 1,12-diaminododecane or 2,2,4-trimethylhexamethylenediamine and the aromatic dicarboxylic acids including those such as isophthalic acid and/or terephthalic acid. A part-aromatic copolyamide of hexamethylenediamine, terephthalic acid and isophthalic acid has proved to be very particularly suitable, in particular the so-called polyhexamethylene terephthalamide/hexamethylene isophthalamide (nylon 6I/6T).

The proportion of part-aromatic copolyamide in the total mixture can likewise vary within broad limits and is generally between about 1 and about 50% by weight, based on the weight of the total mixture, the range from about 5 to about 35% by weight being particularly preferred, in particular about 10 to about 20% by weight.

The acid-modified polyolefin of the present invention can be any polyolefin that contains acidic groups. In particular, the acid-modified polyolefins include a polyolefin and an acidic component. The term polyolefin comprises generally any α-olefin of 4 to 10 carbon atoms, preferably ethylene and/or propylene and/or butylene. The acidic component comprises any α,β-ethylenically unsaturated carboxylic acid, preferably acrylic acid and/or methacrylic acid. In particular ethylene/acrylic acid copolymers, ethylene/methacrylic acid copolymers or ethylene/propylene/acrylic acid copolymers or ethylene/propylene/methacrylic acid copolymers are preferred.

The proportion of the carboxylic acid component in the polyolefin can be varied within wide limits but is in general within the range from 1 to 15 mol %, preferably about 4 to about 9 mol %, even more preferably from about 5.5 to about 8.5 mol %.

The proportion of the acid-modified olefin copolymer in the total mixture is in general in a range from about 5 to about 30% by weight, about 10 to about 25% by weight being preferred and about 15 to about 20% by weight being very particularly preferred, in each case based on the total weight of the mixture.

Pigments in the sense of the present invention means particles, preferably inorganic particles, of a particle size of from about 0.01 to 15 μm. Any known inorganic particles having this size can be used. Preferred inorganic particles are oxides of titanium, of silicon or of calcium, in particular those such as $TiO_2$ and/or $SiO_2$, or pigments having a leaflet structure such as, for example, mica. The particle size of the pigments is preferably in a range from about 0.01 to about 15 μm, in particular from about 0.02 to about 10 μm. Particular preference is given to $TiO_2$ having a particle size of from about 0.05 to about 5 μm. The concentration of pigment in the mixture is generally in a range from about 0.25 to about 5% by weight, in particular about 0.4 to about 3% by weight, preferably about 1 to about 1.5% by weight, based on the total mixture.

In order further to improve particular properties of the food casing according to the invention based on polyamide, additives that do not impair the desired properties of the casing can be contained in the casing in an effective quantity in each case. In particular, stretching aids such as silicone oils are useful.

The production of the casing is carried out by any desired manner, such as by tubular extrusion to give the primary tube and subsequent orientation by stretching in the longitudinal and transverse direction. The casing is then thermoset, avoiding longitudinal and transverse shrinking, so that the film shrinks only a little more on renewed heating. The tubular film thus obtained is scarcely shrinkable any more below 80° C., but is clear and can then be fabricated to give the sausage casing, filled with sausage meat for scalding sausage or boiled sausage, scalded and cooled.

The casing according to the invention is distinguished in particular by an outstanding water vapor barrier action in combination with an excellent oxygen tightness and an outstanding UV impermeability. The water vapor barrier is reduced to a value of almost 8 $g/m^2.d$, wherein an oxygen tightness of about 10 $cm^3/m^2.d$ bar is simultaneously attained. The UV barrier was simultaneously improved, while the excellent transparency surprisingly still was maintained. The result is a casing material for sausage products which have a significantly longer keeping quality and storage life. In practice it has been shown that storage and transport times of the sausages could now be extended from 2 weeks up to 6 weeks. Furthermore, the casing material is easily printable and can be dyed, with, for example, color pigments. In addition it is to be stressed that these casings have a significantly reduced tendency to blocking.

In summary, it is to be emphasized that the food casing according to the invention is distinguished by a surprising combination of advantageous properties, in particular by:
  a very good UV impermeability,
  an outstanding transparency,
  a good printability,
  a high water vapor barrier action,
  an excellent oxygen tightness,
  a low tendency to blocking,
  a good dyeability,
  a low shrinkage,
  fold-free fitting to the sausage product, and ease of processing.

As a result of this surprising combination of excellent properties, a casing is made available that is suitable in particular as a sausage casing for scalding and boiled sausages and that ensures a significantly improved keeping quality and storage time of the sausages.

The casing is produced in the conventional caliber for scalding sausage and boiled sausage, for example, blood sausage, which is usually in the range from about 30 to about 150 mm, in particular about 40 to about 120 mm. Its thickness, in comparison with conventional sausage casings made of polyamide, is relatively low and is generally lower than about 50 micrometers, preferably it is in the range from about 25 to about 40 micrometers. In spite of the low wall thickness, sausage meat can be forced under pressure into the tubular casing without problems.

The invention is described in more detail by the following examples:

EXAMPLE 1

A dryblend mixture of 79.6% by weight of nylon 6, 10% by weight of copolyamide nylon 6I/6T, 10% by weight of ethylene/methacrylic acid copolymer and 0.4% of mica were plastified in an extruder, homogenized and quenched by chilling via a ring die to give a preliminary tube of 19 mm diameter and 300 μm wall thickness.

The tube was then heated and biaxially oriented within the stretching zone according to the procedure described in DE-A 37 29 449. In this case, the following stretching conditions were maintained:
  transverse stretching ratio 1:3.4
  longitudinal stretching ratio 1:2.7

In this manner, a tubular film of 61 mm diameter having a wall thickness of about 35 μm was obtained.

The casing was thermoset in a further process step with the aid of a further blow, avoiding shrinkage in the longitudinal and transverse directions, and was then fabricated to give the sausage casing, filled with cooked sausage meat, scalded and cooled.

For comparison, the production of the following casings was attempted in an analogous method and with the same dimensions:

Comparison Example 1

Casing made of 100% by weight of nylon 6

Comparison Example 2

Casing made of 90% by weight of nylon 6 and 10% by weight of nylon 6I/6T

Comparison Example 3

Casing made of 90% by weight of nylon 6 and 10% by weight of ethylene/methacrylic acid copolymer While the casings of Comparison Examples 1 and 2 were produced without problem, the intended casing according to Comparison Example 3 could not be produced, because the primary tube produced in this comparison test proved to be unstretchable.

The fundamental properties of these casings are listed in the table below.

In a comparison of mechanical properties, the strength of the claimed tube is only slightly reduced in comparison with the pure oriented PA casing (Comparison Example 1) and is even slightly above that of the sausage casing built up according to DE-A 39 43 024 (Comparative Example 2).

In addition, the polymer casing formed from a multiple phase system is distinguished by an improved extension at breakage with, at the same time, only a slight reduction of the $\sigma_5$ value.

However, the significant improvement in the barrier properties, in particular the increase in the water vapor tightness, is particularly to be stressed.

The transmission measurements also reproduced in the diagram (FIG. 1) for the casings produced in the example or comparison example confirms the outstanding property of a good UV barrier and simultaneously improved transmission of light in the visible region possessed by the food casing according to the invention.

The spectral transmission was measured by means of a Spectral Photometer, type PMQ II, from Messrs. Zeiss (light source: hydrogen lamp type H 30).

TABLE

|  | Material % by weight in the mixture | Thickness μm | Flat width mm | $\sigma_5$ longitudinal/ transverse N/mm$^2$ | Tear strength longitudinal/ transverse M/mm$^2$ | Elongation at tear longitudinal transverse % | Water vapor permeability g/m$^2 \cdot$ d | O$_2$ permeability at 85% RH cm$^3 \cdot$ m$^{-2}$ d$^{-1} \cdot$ bar$^{-1}$ |
|---|---|---|---|---|---|---|---|---|
| Example | 80 nylon 6 10 nylon 6I/6T 10 EMA | 34–38 | 96–98 | 17/14 | 171/218 | 180/95 | 8.8 | 11 |
| Comparison Example 1 | 100 nylon 6 | 39–41 | 93–95 | 18/19 | 178/268 | 160/80 | 20 | 17 |
| Comparison Example 2 | 90 nylon 6 10 nylon 6I/6T | 35–40 | 90–93 | 20/15 | 170/195 | 165/73 | 15 | 12 |

The determination of the technical data was carried out by the following methods:

| Tested property | Test standard |
|---|---|
| Tear strength | DIN 53 455 |
| Elongation at tear | DIN 53 455 |
| Water vapor permeability | DIN 53 122 |
| O$_2$ permeability | DIN 53 380 |

What is claimed is:

1. A single-layered, transparent, biaxially oriented, thermoset, tubular food casing, comprising a mixture of:
   a) a linear, aliphatic polyamide,
   b) a partially aromatic copolyamide,
   c) an acid-modified polyolefin and
   d) a pigment having a particle size from about 0.01 to about 15 μm.

2. A tubular food casing as claimed in claim 1, comprising:
   about 44.5 to about 89.5% by weight of a),
   about 1 to about 50% by weight of b),
   about 5 to about 30% by weight of c), and
   about 0.25 to about 3% by weight of d),
   wherein each % by weight is based on the total weight of the mixture.

3. A tubular food casing as claimed in claim 1, wherein the linear aliphatic polyamide is an aliphatic homopolyamide or a copolyamide formed from aliphatic polyamides having 5 to 20 carbon atoms.

4. A tubular food casing as claimed in claim 1, wherein the linear aliphatic polyamide is nylon 6, nylon 11, or nylon 12.

5. A tubular food casing as claimed in claim 1, wherein the partially aromatic copolyamide is formed from aromatic diamine components and aliphatic dicarboxylic acid components or from aromatic dicarboxylic acid components and aliphatic diamine components.

6. A tubular food casing as claimed in claim 1, wherein the partially aromatic copolyamide is formed from hexamethylenediamine, terephthalic acid, and isophthalic acid.

7. A tubular food casing as claimed in claim 1, wherein the acid-modified polyolefin is a copolymer of at least one of ethylene and propylene and an α,β-unsaturated carboxylic acid.

8. A tubular food casing as claimed in claim 1, wherein the acid-modified polyolefin is an ethylene/acrylic acid copolymer or ethylene/methacrylic acid copolymer.

9. A tubular food casing as claimed in claim 1, wherein the pigment has a particle size of from about 0.01 to about 5 μm.

10. A tubular food casing as claimed in claim 1, wherein the pigment is at least one of TiO$_2$, SiO$_2$, or mica.

11. A tubular food casing as claimed in claim 1, comprising
   about 60 to about 80% by weight of a),
   about 10 to about 20% by weight of b),
   about 10 to about 20% by weight of c), and
   about 0.4 to about 1.2% by weight of d).

12. A tubular food casing as claimed in claim 1, wherein said partially aromatic polyamide contains about 40 to about 60 mol % of aromatic units.

13. A tubular food casing as claimed in claim 1, wherein the acid-modified polyolefin is a carboxylic acid modified polyolefin.

14. A tubular food casing as claimed in claim 13, wherein the acid-modified polyolefin contains about 4 to about 9 mol % of carboxylic acid components.

15. A tubular food casing as claimed in claim 1, which further comprises silicone oil.

16. A tubular food casing as claimed in claim 1, which is printed or dyed.

17. A tubular food casing as claimed in claim 1, which has a thickness of about 25 to about 40 micrometers.

18. A tubular food casing as claimed in claim 1, wherein the linear, aliphatic polyamide contains no more than 5 mole % of aromatic components.

19. A tubular food casing as claimed in claim 1, wherein the acid-modified polyolefin is formed from an α-olefin of 4 to 10 carbon atoms and an α,β-ethylenically unsaturated carboxylic acid.

20. A tubular food casing as claimed in claim 1, wherein the acid-modified polyolefin is formed from an α-olefin of 4 to 10 carbon atoms selected from one or more of ethylene, propylene, and butylene, and an α,β-ethylenically unsaturated carboxylic acid selected from one or both of acrylic acid and methacrylic acid.

* * * * *